UNITED STATES PATENT OFFICE.

ABRAM GOLODETZ, OF BERLIN, GERMANY, ASSIGNOR OF ONE-HALF TO BERNHARD BENEDIX, OF HAMBURG, GERMANY.

PROCESS FOR SEPARATING MIXTURES OF LIQUIDS.

1,079,004.  Specification of Letters Patent.  Patented Nov. 18, 1913.

No Drawing.  Application filed August 16, 1912. Serial No. 715,491.

*To all whom it may concern:*

Be it known that I, ABRAM GOLODETZ, subject of the Emperor of Russia, residing at 132 Linienstrasse, Berlin, Germany, have invented certain new and useful Improvements in Processes for Separating Mixtures of Liquids, of which the following is a specification.

The present invention relates to improvements in the process of separating mixtures of liquids into their components by fractional distillation, the object of the present invention being to enable the components of such mixed liquids to be separated, which it was hitherto impossible to separate by ordinary fractional distillation, such as mixtures in which the boiling points of the components closely approximate each other or in which two of the components form a binary homogeneous mixture of minimum boiling point.

In attempting by fractional distillation to separate a mixture of an alcohol and a hydrocarbon, which form a binary homogeneous mixture of minimum boiling point, it has been proposed to add water in amount just sufficient to distil over as a heterogeneous mixture with the whole of the hydrocarbon, leaving more or less pure alcohol. If, however, too much water is added, the binary homogeneous alcohol-water mixture is also formed and part of the alcohol is thus lost on distilling. If, on the other hand, insufficient water is added, the whole of the hydrocarbon will not distil over. It is therefore very difficult to carry out this separation. It has also been proposed to separate a binary homogeneous mixture of minimum boiling point by adding a third liquid, immiscible in the binary mixture, in sufficient quantity to distil over as a ternary heterogeneous mixture with the two components to be separated, part of one of the components remaining behind in the still; but in this case the other part of this component is lost, being carried over in the ternary mixture on distilling.

It may be stated here that a heterogeneous mixture is a mixture of two or more immiscible liquids whose vapor pressure is equal to the sum of the vapor pressures of the components, which is equal to the atmospheric pressure at a temperature lower than the boiling point of any of the components, so that the mixture boils at a temperature lower than any of the components. The composition of the vapor of a heterogeneous mixture does not depend upon the ratio of the components in the mixture but is always constant and the mixture boils at a constant temperature. A homogeneous mixture, on the contrary, is a mixture of two or more miscible liquids whose vapor pressure is less than the sum of the vapor pressures of the components, so that the mixture boils at a temperature which is not necessarily lower than the boiling point of all the components. The vapor of a homogeneous mixture contains the components in the same ratio as the mixture and the mixture boils at a temperature dependent upon the ratio of the components.

The boiling point of a homogeneous mixture usually lies between the boiling points of the components for all proportions of the components in the mixture. When, however, the boiling point of a homogeneous mixture is below the boiling point of all the components, which occurs when the components are present in certain definite proportions, this mixture is termed a mixture of minimum boiling point.

According to the present invention a liquid is added to the mixture to be separated in such quantity and such as to form a binary homogeneous mixture of minimum boiling point with one component only of the original mixture, and the boiling point of the binary homogeneous mixture must be lower than the boiling point of any of the components of the original mixture and lower than the boiling point of their mixture. The added liquid must not form a binary homogeneous mixture of minimum boiling point with more than one component of the original mixture but should be miscible in the other components so that the resulting mixture is homogeneous.

The following example is given of the method of separating the two components A and B of a binary homogeneous mixture of minimum boiling point α according to the present invention.

To the mixture the requisite quantity of a third liquid C is added which will form a binary homogeneous mixture with the component A of minimum boiling point β. The boiling point β must be lower than the boiling point α. Moreover, the third liquid C must be such that it will not form a binary homogeneous mixture of minimum boiling point with the other component B. The third liquid C should be miscible with the component B so as to form a homogeneous mixture.

If the whole mixture containing the three liquids A, B and C referred to is then subjected to fractional distillation, the component A of the original mixture and the added liquid C will be carried over at the corresponding boiling point β. After completion of the distillation the other component B of the original mixture remains in nearly pure condition in the flask as residue.

The distillate A C that passed off the flask may then be separated in the same way by adding a new liquid D which will form a binary homogeneous mixture of minimum boiling point with the liquid C under the aforementioned conditions. In this manner the second component A of the original mixture may be separated. In the same manner the separation of mixtures of liquids having boiling points not far removed from one another may be effected.

The following examples will show how the process according to the present invention is carried out.

Example I: From light oil or crude naphtha consisting mainly of benzene (b. p. 80° C.) toluene and xylene (b. p. 137-140° C.) pure benzene is to be separated. It is known that methyl-alcohol and benzene in the proportion of 39.5 to 60.5 form a binary homogeneous mixture having a minimum boiling point of 59° C. If therefore, methyl-alcohol is added to the light oil or crude naphtha in the proportion of 39.5 parts of alcohol to 60.5 parts of benzene contained in the light oil and the resulting mixture subjected to distillation, benzene and methyl-alcohol will pass off at 59° C. as distillate, whereas the other components of the light oil will remain in the residue. The mixture of benzene and methyl-alcohol may be separated into aqueous methyl-alcohol and benzene by adding water to the mixture. The mixture of benzene and methyl-alcohol may, however, also be separated by adding such quantity of bisulfid of carbon, that the proportion of the latter to the methyl-alcohol is 7 to 1. In this proportion the bisulfid of carbon forms with the methyl-alcohol a binary homogeneous mixture having the minimum boiling point of 37.5°, whereas the bisulfid of carbon will not form such a mixture with the benzene. If the new mixture formed is subjected to distillation the bisulfid of carbon and methyl-alcohol will pass off at the temperature of 37.5° and form two separate layers in the distillate. In the distilling apparatus pure benzene remains as residue.

Example II: 13.5 parts of methyl-alcohol and 86.5 parts of acetone form a binary homogeneous mixture having the minimum boiling point of 55°. For separating such mixture, 256.5 parts bromethylene (b. p. 38°) are added. When distilling this new mixture the whole of the methyl-alcohol passes over together with the bromethylene by forming a binary homogeneous mixture having the minimum boiling point of 35° in the proportion of 1 to 19. In the residue pure acetone remains which does not form a homogeneous mixture of minimum boiling point with bromethylene.

I claim:—

1. The improved process of separating the components of a mixture of liquids which consists in adding to the mixture such a liquid in such quantity that it forms a binary homogeneous mixture of minimum boiling point with one of said components only, said minimum boiling point being lower than the boiling point of any of such components and lower than the boiling point of their mixture, and in thereupon fractionately distilling the whole.

2. The improved process of separating the components of a mixture of liquids which consists in adding to the mixture a liquid, which is miscible with said components so as to form a homogeneous mixture, in such quantity and such that it forms a binary homogeneous mixture of minimum boiling point with one of said components only, said minimum boiling point being lower than the boiling point of any of such components and lower than the boiling point of their mixture, and in thereupon fractionately distilling the whole.

3. The improved process of separating the two components of a binary mixture which consists in adding a third liquid thereto in such quantity and such that it forms a binary homogeneous mixture of minimum boiling point with one of said components only, said minimum boiling point being lower than the boiling point of either of said components and lower than the boiling point of their mixture, and in thereupon fractionately distilling the whole.

4. The improved process of separating the two components of a binary mixture which consists in adding a third liquid thereto miscible with both said components so as to form a homogeneous mixture, said third liquid being such that and being added in such quantity that it forms a binary homogeneous mixture of minimum boiling point with one of said components only, said minimum boiling point being lower than the boiling point of either of said components and lower than the boiling point of their mixture, and in thereupon fractionately distilling the whole.

5. The improved process of separating the two components of a binary homogeneous mixture of minimum boiling point which consists in adding a third liquid thereto in such quantity and such that it forms a binary homogeneous mixture of minimum boiling point with one of said components only and of lower boiling point than the minimum boiling point of the mixture of said components, and in thereupon fractionately distilling the whole.

6. The improved process of separating the two components of a binary homogeneous mixture of minimum boiling point which consists in adding a third liquid thereto miscible with both of said components, said third liquid being such that and being added in such quantity that it forms a binary homogeneous mixture of minimum boiling point with one of said components only of lower boiling point than the minimum boiling point of the mixture of said components, and in thereupon fractionately distilling the whole.

In testimony whereof I affix my signature in presence of two witnesses.

ABRAM GOLODETZ.

Witnesses:
HENRY HASPER,
ARTHUR SCHROEDER.